(12) United States Patent
Windbichler (10) Patent No.: US 10,000,017 B2
(45) Date of Patent: Jun. 19, 2018

(54) METHOD FOR MOUNTING A VORTEX GENERATOR AND MOUNTING APPARATUS FOR CARRYING OUT THE METHOD

(71) Applicant: Senvion GmbH, Hamburg (DE)

(72) Inventor: Ralph Windbichler, Budelsdorf (DE)

(73) Assignee: SENVION GMBH, Hamburg (DE)

( * ) Notice: Subject to any disclaimer, the term of this patent is extended or adjusted under 35 U.S.C. 154(b) by 194 days.

(21) Appl. No.: 14/820,696

(22) Filed: Aug. 7, 2015

(65) Prior Publication Data
US 2016/0039144 A1 Feb. 11, 2016

(30) Foreign Application Priority Data
Aug. 8, 2014 (DE) .................. 10 2014 111 340

(51) Int. Cl.
*B29C 65/54* (2006.01)
*B29C 65/48* (2006.01)
*F16B 11/00* (2006.01)
*F03D 1/06* (2006.01)
*B29C 65/50* (2006.01)
*B29C 65/78* (2006.01)
(Continued)

(52) U.S. Cl.
CPC .......... *B29C 65/48* (2013.01); *B29C 65/5057* (2013.01); *B29C 65/542* (2013.01); *B29C 65/7814* (2013.01); *B29C 66/02245* (2013.01); *B29C 66/1122* (2013.01); *B29C 66/5326* (2013.01); *B29C 66/82423* (2013.01); *B29C 66/92653* (2013.01); *F03D 1/0675* (2013.01); *F16B 11/006* (2013.01); *B29C 65/7826* (2013.01); *B29C 66/026* (2013.01); *B29C 66/73161* (2013.01); *B29C 66/876* (2013.01); *B29L 2031/08* (2013.01); *B29L 2031/085* (2013.01); *F05B 2240/122* (2013.01); *F05B 2260/96* (2013.01); *Y02E 10/721* (2013.01); *Y02P 70/523* (2015.11)

(58) Field of Classification Search
CPC .................................................... B29C 65/542
See application file for complete search history.

(56) References Cited

U.S. PATENT DOCUMENTS

2014/0003953 A1* 1/2014 Zeller ..................... F03D 1/065
416/223 R

FOREIGN PATENT DOCUMENTS

| CA | 2 809 290 | 12/2015 |
| DE | 44 16 884 A1 | 11/1995 |
| DE | 100 00 355 A1 | 7/2001 |

(Continued)

*Primary Examiner* — Jeffry H Aftergut
(74) *Attorney, Agent, or Firm* — Bay State IP, LLC (57) ABSTRACT

The invention relates to a method for securing an attachment (3, 33) to a component, in particular a rotor blade (1), in which the component is provided with an adhesion surface (36), the attachment (3, 33) is provided with a corresponding adhesion surface (9), the attachment (3, 33) is provided with an adhesive-conveying connection to the corresponding adhesion surface (9), the adhesion surface (36) is placed on the corresponding adhesion surface (9), a gap (53) is formed between the adhesion surface (36) and the corresponding adhesion surface (9), the attachment (3, 33) is pressed against the corresponding adhesion surface (9) and at the same time the adhesive (80) is injected into the gap (53) through the adhesive-conveying connection.

21 Claims, 6 Drawing Sheets

(51) Int. Cl.
*B29C 65/00* (2006.01)
*B29L 31/08* (2006.01)

(56) References Cited

FOREIGN PATENT DOCUMENTS

| | | |
|---|---|---|
| DE | 101 55 312 A1 | 5/2003 |
| DE | 10 2004 012 786 | 9/2005 |
| DE | 10 2008 058 390 | 6/2010 |
| DE | 10 2009 029 657 | 3/2011 |
| DE | 10 2010 006 328 | 8/2011 |
| DE | 10 2010 042327 | 4/2012 |
| EP | 0 353 510 A1 | 7/1989 |

\* cited by examiner

METHOD FOR MOUNTING A VORTEX GENERATOR AND MOUNTING APPARATUS FOR CARRYING OUT THE METHOD

CROSS REFERENCE TO RELATED APPLICATION

This application claims the benefit of and takes priority from German Patent Application No. DE 10 2014 111 340.3 filed on Aug. 8, 2014, the contents of which are herein incorporated by reference.

BACKGROUND OF THE INVENTION

Field of the Invention

The invention relates to a method for securing an attachment to an adhesion surface of a component, in particular of a rotor blade. The invention also relates to a mounting apparatus for carrying out the method according to the invention.

DESCRIPTION OF THE RELATED ART

Methods for securing attachments to a component have of course been known for a long time in the prior art. In particular, it is also known to secure vortex generators to components of a wind turbine, in particular to a rotor blade.

Various attachments must be attached to a rotor blade, depending on the type of rotor blade, still during the production process or also at the construction site. These attachments are for example rain deflectors, vortex generators or what are termed stall strips. Such stall strips are attached to the rotor blade leading edge. They bring about earlier onset of flow separation of the air flow flowing around the rotor blade. It is thus possible to limit the maximum power take-up of the wind turbine.

Vortex generators, on the other hand, are generally wings of triangular cross section which project essentially perpendicular from a suction side of the rotor blade outer skin. The triangle is formed as a right triangle such that it has a vertical side oriented toward the rotor blade trailing edge and an inclined side oriented toward the rotor blade leading edge. Vortex generators can be arranged on the diagonal with respect to one another or exactly parallel with respect to one another with respect to the air flow direction on the rotor blade outer skin. When the rotor blade is flowed around, each vortex generator generates, downstream, a vortex which separates downstream from the vertical edge of the vortex generator. These vortices prevent the formation of too strong and too thick a turbulent boundary layer between the outer skin of the rotor blade and the laminar air flow flowing around the rotor blade. This counteracts detachment or separation of the laminar flow from the rotor blade, and higher and stronger lift forces can act and form on the rotor blade.

Whichever attachment is to be attached to the rotor blade, it is generally always important that the mounting is effected as quickly and as reliably as possible, and that the attachment is durably bonded to the rotor blade.

According to the prior art, the attachments are secured to the rotor blade with various adhesive bonds or screw connections or also rivets. In order to produce the adhesive bond, the two adhesion surfaces of the attachment and of the rotor blade are coated beforehand with the adhesive and the attachment is held fixed on the rotor blade until the adhesive has cured or at least is strong enough that the component can no longer slip and/or fall off. For producing the adhesive bond, use is in particular made of epoxy resin adhesives, PU adhesives (that is to say polyurethane-based adhesives) and MA adhesives (that is to say methacrylate-based adhesives).

It has been found that the abovementioned bonds are not durable. The attachments must periodically be entirely removed and bonded anew. Although it is possible, in order to increase service lives, to use adhesives with long fixing and curing times, this has the notable drawback that the attachments must be held in place for a long time during the bonding process. It has also been found that it is difficult in practice to coat two adhesion surfaces with adhesive in a homogeneous manner, since the occurrence of air inclusions, air bubbles and the like appears to a substantial extent.

SUMMARY OF THE INVENTION

The present invention therefore has the object of providing a method, as mentioned in the introduction, for securing an attachment to a component, which method produces a durable bonded connection and yet in which the fitter does not have to hold the attachment in place for a long time. The present invention also has the object of providing a mounting apparatus by means of which it is possible to carry out such a method.

The first aspect of the object is achieved with a method having the features of claim 1.

The method according to the invention is particularly suitable for securing an attachment to a component, in particular to a rotor blade. It is however not restricted to rotor blades but is also suitable for securing attachments to other devices of a wind turbine. It is even conceivable to use the method according to the invention for example to attach attachments to motorcycle helmets. The method according to the invention is in particular suitable for bonding attachments to laminated composites, wherein the attachment is itself expediently also a laminated part or a laminated composite.

According to the invention, the component is provided with an adhesion surface and the attachment is provided with a corresponding adhesion surface. The securing method is in essence a bonding method. For securing, the adhesion surface and the corresponding adhesion surface are positioned facing each other without however making contact over their entire surfaces. According to the invention, a gap is formed between the adhesion surface and the corresponding adhesion surface, which makes up the largest area of the adhesion surface. The attachment is pressed, with its adhesion surface, against the corresponding adhesion surface, in order to at least temporarily keep a fixed position. At the same time, adhesive is injected into the gap. The attachment is pressed against the component until the adhesive has entirely cured or at least has cured to the extent that the attachment forms a strong adhesive bond with the component. An adhesive strip can be used for pressing.

In order to carry out the method according to the invention, the attachment is provided with openings which have an adhesive-conveying connection to the corresponding adhesion surface. According to the invention, the preferably liquid adhesive is conveyed through the openings of the attachment to the corresponding adhesion surface of the latter. Thence, the liquid adhesive passes into the gap and entirely fills the gap between the adhesion surface and the corresponding adhesion surface, preferably without air or bubbles. Once the gap is entirely filled with adhesive without air or bubbles, the supply of adhesive is stopped and the adhesive begins to cure and to produce a strong adhesive bond between the attachment and the component.

In one preferred variant of the method according to the invention, the gap between the adhesion surface and the corresponding adhesion surface is closed off circumferentially in an adhesive-tight manner. The gap expediently extends over approximately the entire extent of the adhesion surface and of the adhesion surface corresponding thereto. Expediently, there is provided at the edges of the adhesion surface a seal which seals the gap with respect to the environment, expediently in an adhesive-tight manner and preferably in an airtight manner. This prevents the liquid adhesive conveyed in the gap from issuing from the gap.

In this variant of the method, a double-sided adhesive strip is expediently stuck around the circumference of the corresponding adhesion surface, and the adhesion surface of the attachment, provided with the double-sided adhesive strip, is placed on the corresponding adhesion surface, and the adhesive bond of the double-sided adhesive strip forms, between the adhesion surface and the corresponding adhesion surface, the adhesive-tight seal which seals the gap around its circumference. When applying the double-sided adhesive strip to the attachment, care must be taken that sections of the adhesive strip which are cut from a roll are stuck down without overlaps or steps but rather in abutment against one another, in order to form a line of adhesive strip which surrounds the entire corresponding adhesion surface with an even height and without holes. After application of the adhesive strip onto the corresponding adhesion surface, along the entire circumference of the latter, a protective film is removed from the free side of the adhesive strip and the attachment is pressed, in its precise position, against the adhesion surface of the component.

The adhesive strip has, on one hand, the function that it holds the attachment against the component, at least for a short time, in order to permit the actual bonding process by injection of the liquid adhesive with a stabilized relative arrangement; on the other hand, the circumferential adhesive strip produces an adhesive-tight closure which seals the gap with respect to the outside and prevents adhesive from issuing from the gap.

According to the invention, openings are introduced into the attachment, in the event that openings in the attachment are not already provided during the production process for the attachment.

Preferably, those regions of an outer wall of the attachment which lie opposite the corresponding adhesion surface are covered with a protective strip, and the openings are introduced through the respective protective strip into the attachment. In this context, the protective strip is preferably arranged only over outlet openings; inlet openings may, but need not necessarily, be covered with the protective strip.

Expediently, the protective strips prevent direct contact between the outer wall of the attachment and excess adhesive which has been introduced into the gap and which issues from the outlet openings and possibly also from the inlet opening. The protective strips can be removed again from the outer wall after the adhesive has penetrated into the gap and has issued in small quantities from the outlet openings, and leave an adhesive-free outer wall of the attachment.

In order to produce a strong adhesive bond between the attachment and the component, it is necessary for the attachment not only to be held fixed on the component but also to be pressed against the latter. According to the invention, a pressing tool is temporarily arranged on or above the attachment, which tool suctions onto an outer wall of the device and presses the attachment against the outer wall of the component. The component may be a wind turbine, in particular a rotor blade.

In order to permit the procedure of pressing the attachment against the component, the pressing tool is preferably in contact with the attachment at the circumferential rim of the latter and presses the circumferential rim against the corresponding adhesion surface of the device, in particular of the rotor blade. The attachment is generally elastic. It is however sufficient, for generating a sufficiently large pressing pressure of the attachment against the device, to press the attachment at a circumferential rim. By virtue of the pressing pressure along the circumferential rim, the rim cannot slip on the device and the attachment retains its original shape either essentially or entirely during the method.

Expediently, adhesive is pressed into the gap through at least one of the openings. To that end, there is provided an injection apparatus which is connected to the at least one inlet opening and presses liquid adhesive, under pressure, into the gap through the at least one inlet opening. Exactly one or two or also any greater number of inlet openings can be present. The pressure can be built up by means of an adhesive pump, for example in the form of a movable piston. The adhesive, introduced under pressure through the at least one inlet opening, spreads in the gap between the adhesion surface and the corresponding adhesion surface and leaves the gap again from the at least one outlet opening. Adhesive is pressed into the gap until at least some adhesive has issued from all of the outlet openings, such that a visual check can be made to ensure that the entire gap is filled with adhesive. This permits a full-area adhesive bond without air inclusions between the attachment and the device. This saves on expensive testing methods.

In another variant of the injection method for the adhesive, a vacuum is generated in the gap through at least one of the openings and adhesive is injected into the gap through at least one other opening. In that context, therefore, no pressure is built up at the adhesive supply, rather the adhesive is sucked, almost by a vacuum in the gap, from an adhesive reservoir and also thus spreads through the entire gap. In order to carry out this method, the circumferential sealing of the gap must be not only adhesive-tight but also airtight.

Preferably, the adhesion surface and particularly preferably also the corresponding adhesion surface, as regions of the component and, respectively, of the attachment, are prepared prior to application of the adhesive to the component and, respectively, the attachment. In particular, the regions for the adhesion surface and, respectively, for the corresponding adhesion surface are roughened in order to produce as strong an adhesive bond as possible between the adhesive and the respective adhesion surface.

Preferably, the adhesion surface and the corresponding adhesion surface are also cleaned prior to application of the adhesive.

In its second aspect, the object is achieved with a mounting apparatus having the features of claim 13.

The mounting apparatus according to the invention comprises a pressing tool and an injection device.

The pressing tool is intended for pressing an attachment having an adhesion surface against a corresponding adhesion surface of a component, in particular of a rotor blade. The pressing tool comprises at least one suction device by means of which the pressing tool can be temporarily suctioned onto a wall of the component, and a pressing device by means of which the attachment is pressed in a sealed manner, forming a gap between the adhesion surface and the corresponding adhesion surface, against the corresponding adhesion surface, and is thus simultaneously sealed. The pressing tool prevents the component from being inflated by the adhesive which is pressed in, and it keeps the attachment in its original shape.

In one embodiment, the mounting apparatus also has the injection device for injecting adhesive into the gap between the adhesion surface and the corresponding adhesion surface.

The entire mounting apparatus is intended for carrying out one of the methods according to the invention, mentioned in the introduction, but it is not intended to remain on the component. After the bonding process has been carried out, it is removed again from the component and leaves behind an attachment which is strongly bonded to the component.

Expediently, the suction device is formed as at least one suction pad. A suction pad is a planar suction surface which, expediently, is connected to a vacuum line. When the suction pad is placed on as planar and smooth an outer wall of the component as possible, such as the rotor blade outer skin, a vacuum is produced, via the vacuum line, on the rotor blade-side bearing surface of the suction pad and the suction pad is suctioned onto the outer wall by the vacuum which forms.

Preferably, the pressing tool of the mounting apparatus has two or more suction pads in order to produce an at least temporarily slip-free connection between the mounting tool and the component, such that the attachment can be pressed, by the pressing tool of the mounting apparatus, securely and fixedly against the component.

Expediently, a rod assembly extends from the suction pad and the pressing device for the attachment is provided on the suction pad-side of the rod assembly.

Preferably, the pressing device has a pressing dome with a circumferential pressing surface. It is thus possible that the attachment, which is preferably the baseplate of a vortex generator, is pressed along its circumference against the outer wall, preferably the rotor blade outer skin.

Preferably, the pressing dome has at least one depression to the height of the pressing surface of the pressing dome, which permits actuation through the depression to the pressed attachment. The actuation can for example be attaching an injection nozzle of an injection hose to the at least one inlet opening of the attachment, or also attaching vacuum lines to all of the outlet openings of the attachment, in order to generate a vacuum in the gap between the corresponding adhesion surface and the adhesion surface.

In one preferred embodiment of the mounting apparatus according to the invention, the pressing device is made height-adjustable parallel to the suction pad. This permits subsequent adjustment of the pressing pressure of the attachment on the component.

The mounting apparatus preferably has an injection device with an injection nozzle for connecting to at least one inlet opening of the attachment. The injection nozzle is expediently connected by the fitter by lowering the pressing dome onto the at least one inlet opening. To that end, the at least one inlet opening has a connector which corresponds to the injection nozzle and which permits an adhesive-tight connection.

In a further expedient embodiment of the invention, the injection device has a vacuum pump which can be connected to the at least one and preferably to all of the outlet openings on the component, and which generates a vacuum in the gap.

BRIEF DESCRIPTION OF THE DRAWINGS

The invention is described with reference to an exemplary embodiment in six figures, in which:

FIG. 2b shows, in a view from below, the baseplate from FIG. 2a;

DETAILED DESCRIPTION OF THE SEVERAL EMBODIMENTS

Figure 1:
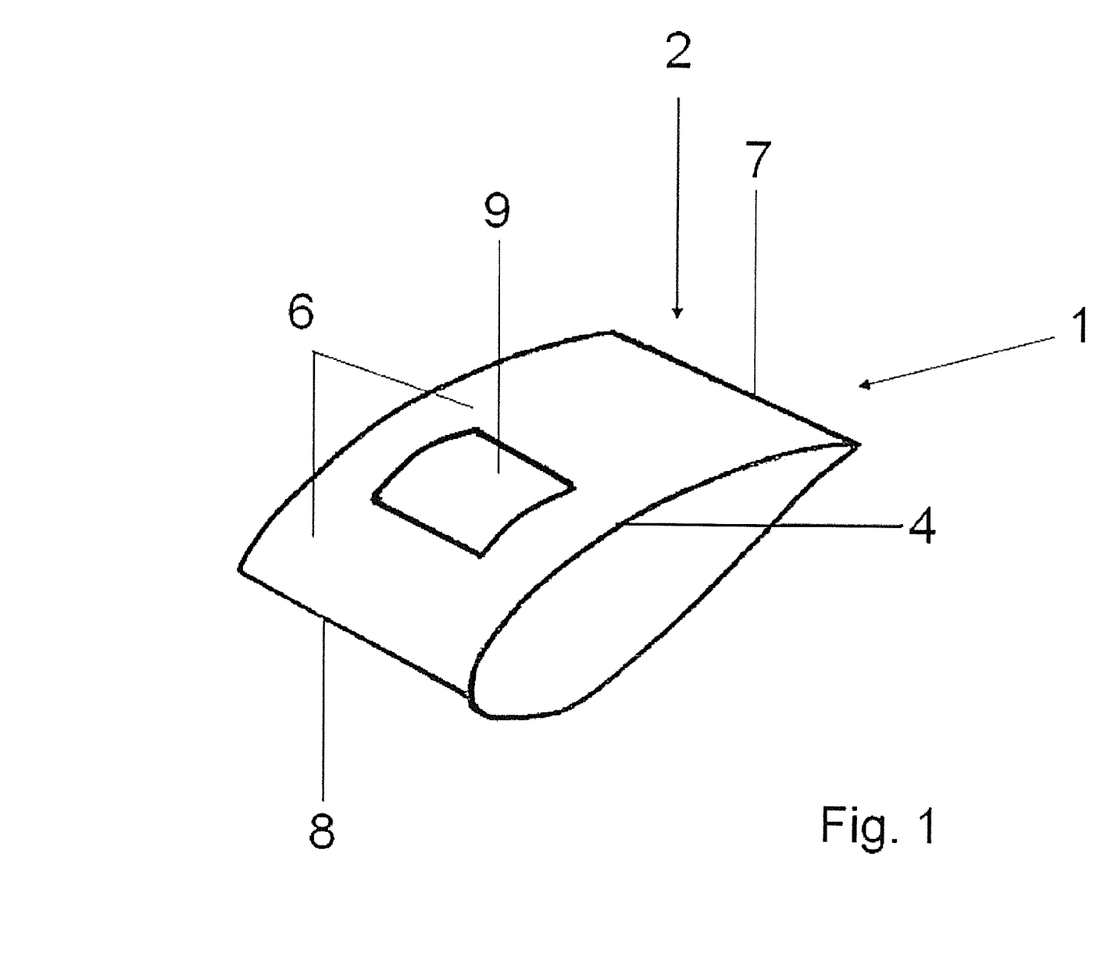
FIG. 1 is a perspective view of a section of a rotor blade, with a corresponding adhesion surface.
Figure 2A:
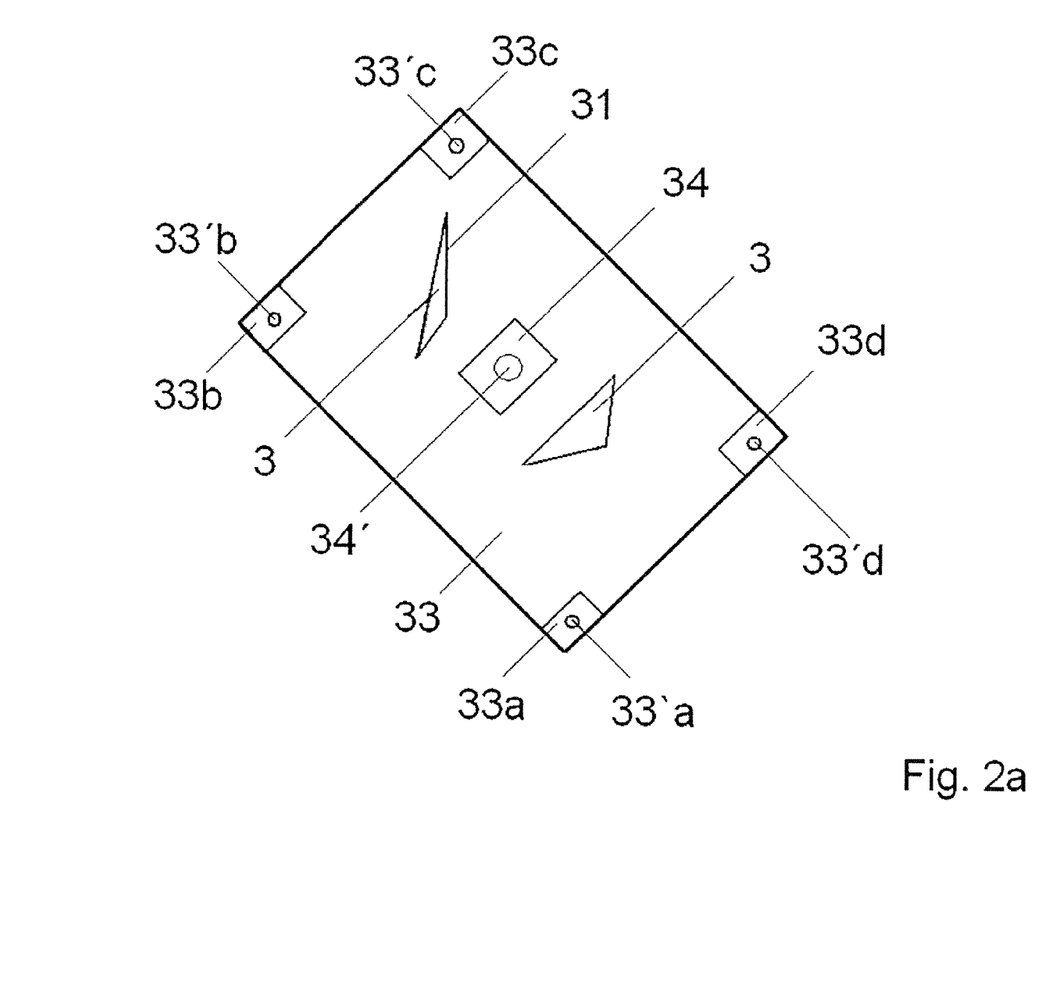
FIG. 2a shows, in plan view, a baseplate, prepared for use in a securing method according to the invention, with two vortex generators.
Figure 2B:
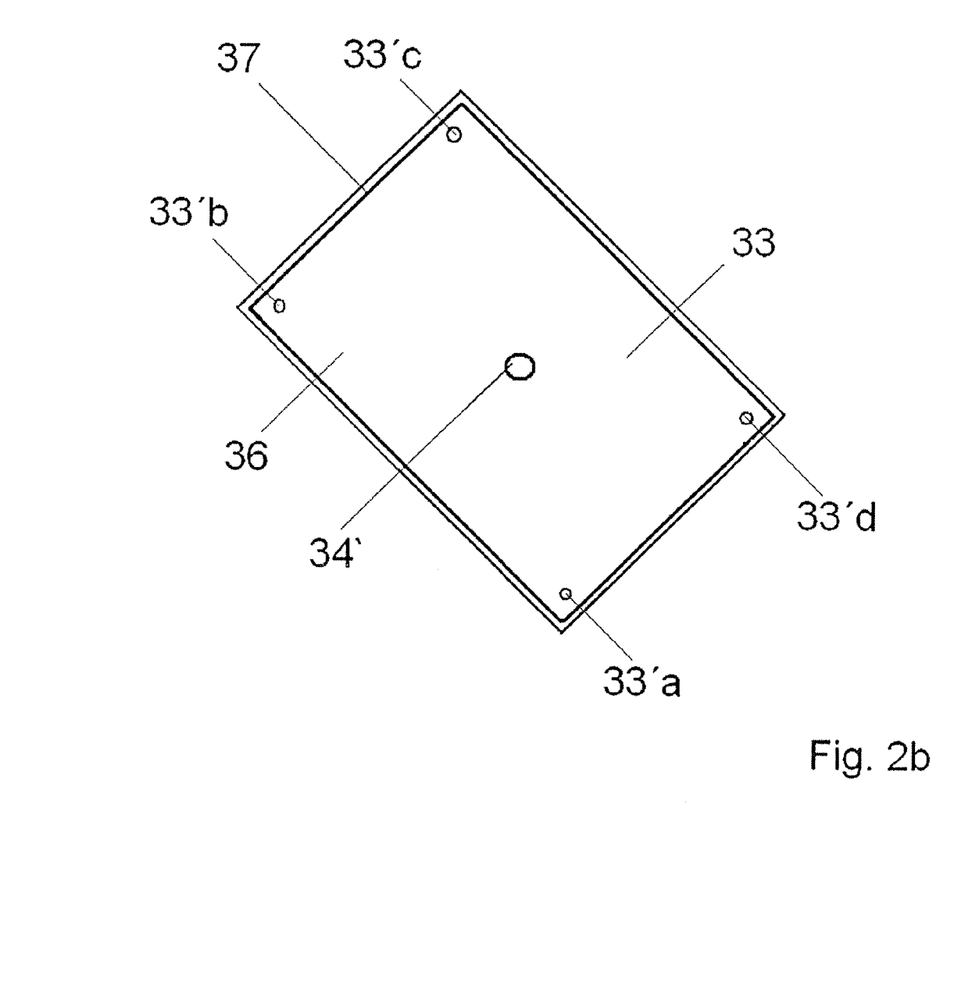
Figure 3:
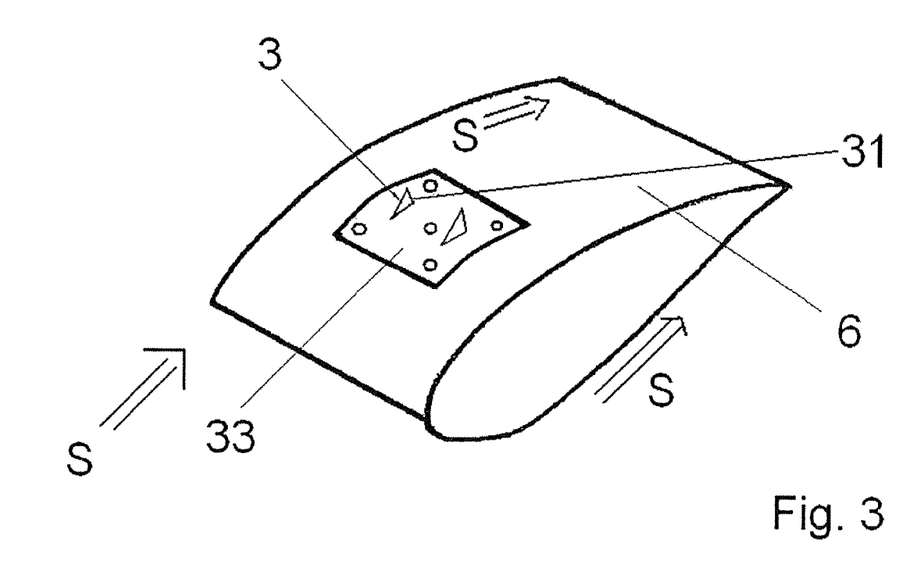
FIG. 3 is a view of the rotor blade in FIG. 1 with a bonded baseplate having vortex generators.

FIG. 1 shows a section of a rotor blade 1 prepared for carrying out the method according to the invention. The rotor blade 1 which belongs to a section of a rotor blade 2 in FIG. 1 is part of a wind turbine (not shown). It is common in wind turbines, in order to increase the lift of the rotor blade 1, to provide the rotor blade 1 with vortex generators 3. Vortex generators 3 as shown in FIGS. 2a, 2b and 3 are generally wings of triangular cross section which project perpendicular from a suction side 4 of a rotor blade outer skin 6. The triangular wing is formed as a right triangle such that it has a vertical side 31 oriented toward a rotor blade trailing edge 7 and an inclined side oriented toward a rotor blade leading edge 8. Vortex generators 3 can be arranged on the diagonal, as shown in FIG. 3, or exactly parallel with respect to an air flow direction S on the rotor blade outer skin 6. When the rotor blade 1 is flowed around, each vortex generator 3 generates, downstream, a vortex which separates downstream from the vertical edge 31 of the vortex generator 3. The vortex prevents the formation of too strong and too thick a turbulent boundary layer between the rotor blade outer skin 6 of the rotor blade 1 and the laminar air flow S flowing around the rotor blade 1. This counteracts detachment of the laminar flow from the rotor blade 1, and higher and stronger lift forces can act and form on the rotor blade 1.

Vortex generators 3 are frequently integrated into a baseplate 33 as shown in FIGS. 2a and 2b. The arrangement of vortex generator 3 and baseplate 33 is, as shown in FIGS. 2a and 2b, an integrated component which is for example produced in one piece from a plastic in an injection molding method.

The baseplate 33 in FIGS. 2a and 2b is bonded to a corresponding adhesion surface 9 which in FIG. 1 is provided at a distance from the rotor blade leading edge 8. The bonding is effected in the method according to the invention.

In a first step of the method, the corresponding adhesion surface 9 of the rotor blade outer skin 6 is prepared.

The corresponding adhesion surface 9 is roughened and cleaned. In order to generate sufficient roughness, the corresponding adhesion surface 9 can be either blasted or rubbed with sand beforehand. In another variant of the method, the rotor blade 1 is already manufactured, during production thereof, with a protective film which surrounds the rotor blade outer skin 6, in particular in the region of the corresponding adhesion surface 9. The protective film is introduced as the first layer in a manufacturing mold for a rotor blade half-shell, and then the laminated construction is introduced into the rotor blade half-shell on top of the protective film. The finished rotor blade half-shell is removed from the manufacturing mold and the protective film represents the outermost skin of the rotor blade outer skin 6.

Once both rotor blade half-shells have been bonded together, and the entire rotor blade 1 has been finished, the protective film can be removed from the laminated composite of the rotor blade 1 and leaves behind the rough and clean corresponding adhesion surface 9. To that end, the protective film must be removed immediately prior to bonding the baseplate 33 of the vortex generator 3. No subsequent treatment of the corresponding adhesion surface 9, for example with sand or other contaminants, may take place once the protective film has been removed. No more than half an hour may elapse between removing the protective film and bonding the baseplate 33 onto the corresponding adhesion surface 9, since otherwise the corresponding adhesion surface 9, from which the protective film has been removed, will already be contaminated with dust particles which are present in the ambient air.

If the corresponding adhesion surface 9 is not provided with a protective film, or the protective film has been removed a longer time ago, the corresponding adhesion surface 9 is treated with sand prior to actually bonding the baseplate 33. To that end, the corresponding adhesion surface 9 is blasted with sand having a grain size of 80 to 200 grit.

After the sand treatment, the corresponding adhesion surface 9 is cleaned of dust and other contaminants. The corresponding adhesion surface 9 is cleaned for example with 3M's VHB® Surface Cleaner. VHB® Surface Cleaner is generally commercially available under this name.

Alternatively, it is also possible to clean the corresponding adhesion surface 9 with isopropyl alcohol. For safety reasons, the isopropyl alcohol may be mixed with water, wherein the isopropyl alcohol makes up at least 50% by volume of the mixture.

After cleaning, the baseplate 33 should be bonded within at most half an hour.

FIGS. 2a and 2b show, by way of example, the conventional baseplate 33 with two vortex generators 3, which has been prepared for the method according to the invention. On the rotor blade-side, on the upper side of the baseplate 33, first a section of a protective strip 33a, 33b, 33c, 33d is stuck onto each of the four corners and a section of a protective strip 34 is stuck on centrally, which sections are removed again after the end of the securing method. The sections of the protective strips 33a, 33b, 33c, 33d, 34 may in each case be a section of a one-sided adhesive strip. It does not remain on the upper side of the baseplate 33.

Once the five sections of the protective strips 33a, 33b, 33c, 33d, 34 have been stuck on, a hole is bored through the five sections of the protective strips 33a, 33b, 33c, 33d, 34 and through the baseplate 33, at each of the four corners and centrally. The hole is preferably circular and in each case passes all the way through the baseplate 33. However, other hole cross sections are also conceivable. An inlet opening 34' introduced in FIG. 2a in the central section of the protective strip 34 and into the baseplate 33 has a diameter of 5.5 mm and is at the same distance from each of the four corners, while four outlet openings 33'a, 33'b, 33'c, 33'd, which are bored through the four sections of the protective strips 33a, 33b, 33c, 33d and the corners of the baseplate 33, each have an internal diameter of 2.5 mm.

FIG. 2b shows the baseplate 33 with the two vortex generators 3 in a view from below. It shows the four outlet openings 33'a, 33'b, 33'c, 33'd and the central inlet opening 34', the central inlet opening 34' is approximately twice as big as the four outlet openings 33'a, 33'b, 33'c, 33'd of the corners, which four are all of equal size. These five openings 33'a, 33'b, 33'c, 33'd, 34' are embodied here as bores of circular cross section.

A double-sided adhesive strip 37 is stuck circumferentially along the outer rim of the underside of the baseplate 33, which is shown in FIG. 2b and functions as the adhesion surface 36. When the double-sided adhesive strip 37 is stuck to the rim of the adhesion surface 36, care must be taken that the circumferential double-sided adhesive strip 37 runs around the baseplate 33 evenly and without forming steps, since the circumferential double-sided adhesive strip 37 is stuck to the adhesion surface 36 for the prior fixing of the baseplate 33 onto the corresponding adhesion surface 9 of the rotor blade outer skin 6 and the double-sided adhesive strip 37 functions as a seal in subsequent stages of the method. In that context, the prior adhesive bond between the baseplate 33 and the rotor blade outer skin 6 must in some methods be adhesive-tight, but in other methods also be airtight, such that the double-sided adhesive strip 37 is stuck on carefully and without spaces or overlaps, circumferentially along the rim of the underside of the baseplate 33. The separation of the outlet openings 33'a, 33'b, 33'c, 33'd from the double-sided adhesive strip 37 should be at most 5 mm. For the double-sided adhesive strip 37, use may be made of an acrylic foam adhesive strip SAFT® 3230 (VHB 4991) made by 3M, with a thickness of 2.3 mm and a width of 10 mm.

Prior to application of the double-sided adhesive strip 37, the underside of the baseplate 33 is also cleaned with 3M VHB® Surface Cleaner or isopropyl alcohol, wherein here too for safety reasons the isopropyl alcohol is diluted with water, wherein the isopropyl alcohol makes up less than 50% by volume of the mixture. Once the adhesion surface 36 is dry, the adhesion surface 36 is cleaned with a dry, clean cloth in order to remove cleaning remnants. After cleaning, neither the adhesion surface 36 of the baseplate 33 nor the corresponding adhesion surface 9 of the rotor blade outer skin 6 may be touched without gloves. The adhesion surface 36 and the corresponding adhesion surface 9 are of equal size and have an identical circumferential outer shape. They match each other exactly.

FIG. 3 shows the baseplate 33 which has already been stuck onto the rotor blade outer skin 6. After the baseplate 33 has been stuck on, the two vortex generators 3 project perpendicular from the rotor blade outer skin 6, in order as described above to each generate lift-increasing air vortices.

Figure 4:
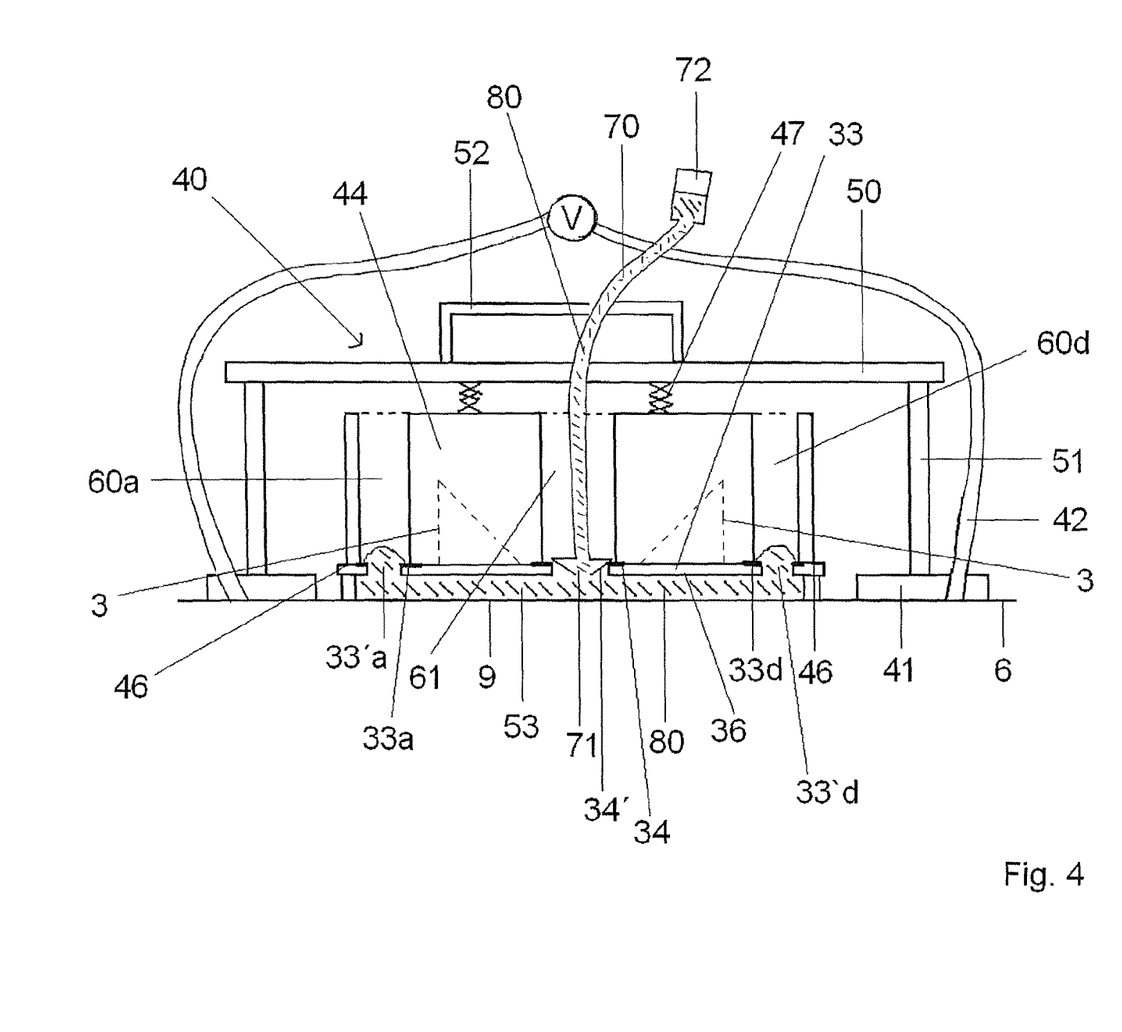
FIG. 4 is a side view of a mounting apparatus according to the invention having a pressing tool above a baseplate having a vortex generator, and an injection device.
Figure 5:
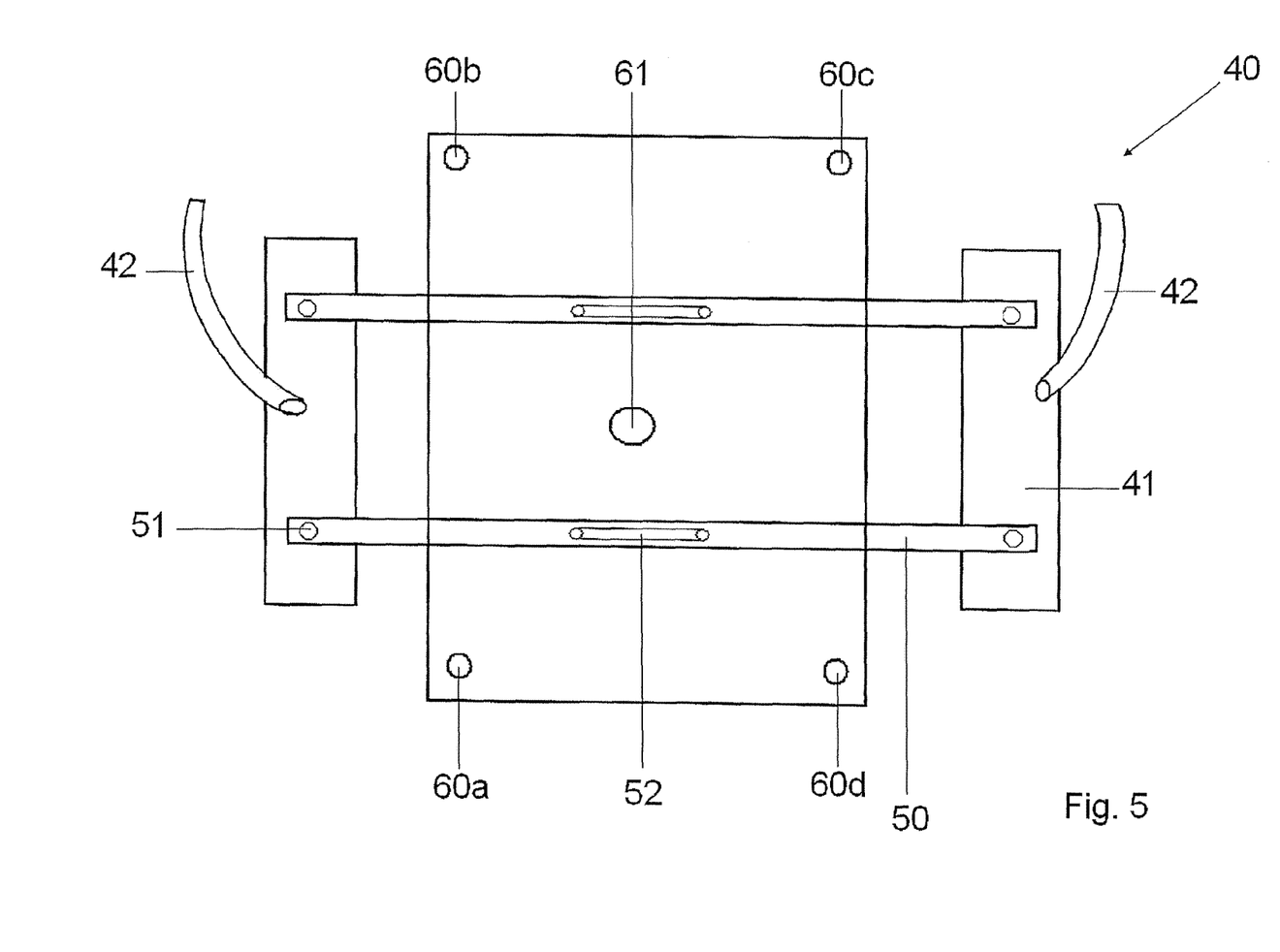
FIG. 5 is a plan view of the pressing tool from FIG. 4.

FIGS. 4 and 5 show a pressing tool 40 according to the invention, by means of which tool the baseplate 33 can be stuck reliably and securely with its adhesion surface 36 on the corresponding adhesion surface 9 of the rotor blade outer skin 6.

The pressing tool 40 is represented in FIG. 4, above and encompassing the baseplate 33 with the vortex generators 3. The pressing tool 40 has two suction pads 41, from each of which there leaves a vacuum hose 42 which generates a vacuum on the rotor blade-side of the suction pads 41, and thus temporarily suction the suction pads 41 securely and slip- and separation-free onto the rotor blade outer skin 6. By conversely injecting air through the vacuum hoses 42, the suction pads 41 of course immediately lose their suction power, and the pressing tool 40 can easily be removed again from the rotor blade outer skin 6 after the end of the method.

The pressing tool 40 further has a pressing dome 44. The pressing dome 44 has, in this exemplary embodiment, an internal height which is greater than the greatest height of the accommodated vortex generators 3 above the outer side of the baseplate 33. Furthermore, a circumferential edge of the pressing dome 44, which serves as a circumferential pressing surface 46, has dimensions which are matched to the dimensions of the circumference of the baseplate 33. A width separation between mutually opposing sections of the circumferential pressing surface 46 is made approximately 1 cm less than the width of the baseplate 33, while a length separation between mutually opposing sections of the circumferential pressing surface 46 is likewise made somewhat less, i.e. approximately 1 cm less, than the length of the baseplate 33. The pressing dome 44 is connected to two transverse rods 50 by means of a height-adjustment mechanism 47 such that its height can be adjusted with respect to these rods. The two transverse rods 50 are connected to the two suction pads 41 via vertical rods 51. A handle 52, by means of which the entire pressing tool 40 can be affixed, extends from each of the transverse rods 50. The height-adjustment mechanism 47 between the pressing dome 44 and the transverse rod 50 makes it possible to change the distance between the pressing dome 44 and the rotor blade outer skin 6, and thus to change a pressing pressure of the pressing tool 40 against the baseplate 33.

As shown in FIG. 4, the baseplate 33 does not bear in a form-fitting manner against the rotor blade outer skin 6, rather it is, as shown in FIG. 2b, arranged, by means of the circumferential double-sided adhesive strip 37 along the entire adhesion surface 36, separated by a gap 53 from the rotor blade outer skin 6. The adhesion surface 36 and the corresponding adhesion surface 9 have, over their entire extent, an essentially identical separation with respect to one another, which corresponds to a height of the gap 53.

The pressing dome 44 has four depressions 60a, 60b, 60c, 60d at its four rounded-off corners, and a central depression 61. The depressions 60a, 60b, 60c, 60d, 61 are open toward the baseplate 33 and, when the pressing dome 44 is correctly adjusted above the baseplate 33, allow a view of and access to the inlet opening 34' and the four outlet openings 33'a, 33'b, 33'c, 33'd, i.e. the inlet opening 34' can be served by the central depression 61 in the pressing dome 44.

FIG. 4 shows an injection hose 70 with an injection nozzle 71 which is plugged into the inlet opening 34'. The injection hose 70 can be plugged through the central depression 61 in the pressing dome 44 into the inlet opening 34'. The injection hose 70 has, at its opposite end from the injection nozzle 71, a pump 72 by means of which liquid adhesive 80 can be—and is—pressed through the injection hose 70 and the injection nozzle 71 into the gap 53. Adhesive 80 is pressed into the gap 53 until at least some adhesive 80 issues forth from all four outlet openings 33'a, 33'b, 33'c, 33'd. The outlet openings 33'a, 33'b, 33'c, 33'd are also visible via the four depressions 60a, 60b, 60c, 60d of the pressing dome 44, such that visual recognition is possible of the moment that the gap 53 is entirely filled with adhesive 80.

In another variant (not shown here) of the pressing tool 40, the adhesive 80 is not pressed in by means of the pump 72, but rather a vacuum hose is connected to each of the four outlet openings 33'a, 33'b, 33'c, 33'd, and a vacuum pump generates a vacuum in the gap 53. By connecting an injection device to the inlet opening 34', liquid adhesive 80 is sucked in homogeneous fashion into the gap 53, where it spreads out. The vacuum device for generating the vacuum in the gap 53 and the vacuum device for generating the vacuum in the suction pads 41 are not connected to one another.

FIG. 5 shows the pressing tool 40 of FIG. 4 in plan view. Here, identical reference signs denote identical components, as shown in FIG. 4. Recognizable are the two horizontal transverse rods 50, at one end of which is arranged one of the two suction pads 41 and at the other end of which is arranged the other of the two suction pads 41 via the vertical rods 51. The vacuum hose 42 extends from each of the two suction pads 41. The two transverse rods 50 are provided with the two handles 52 by means of which it is possible to hold and lift and affix the entire pressing tool 40 of FIG. 5. In particular, FIG. 5 shows the central depression 61 toward the inlet opening 34' and the four depressions 60a, 60b, 60c, 60d at the rounded-off corners of the pressing dome toward the four outlet openings 33'a, 33'b, 33'c, 33'd. The respective outlet openings 33'a, 33'b, 33'c, 33'd of the baseplate 33 are visible through the four depressions 60a, 60b, 60c, 60d when the pressing tool 40 is correctly placed on the baseplate 33. The pressing tool 40 makes it possible, according to the invention, to firmly press the baseplate 33 onto the corresponding adhesion surface 9 and further to distribute the liquid adhesive 80 in a very homogeneous manner, without the inclusion of air bubbles, in the gap 53 between the adhesion surface 36 and the corresponding adhesion surface 9, in order to thus produce a particularly strong and durable adhesive bond.

LIST OF REFERENCE SIGNS

1 Rotor blade
2 Section of a rotor blade
3 Vortex generator
4 Suction side of a rotor blade outer skin
6 Rotor blade outer skin
7 Rotor blade trailing edge
8 Rotor blade leading edge
9 Corresponding adhesion surface
31 Perpendicular triangle side
33 Baseplate
33a Protective strip section
33b Protective strip section
33c Protective strip section
33d Protective strip section
33'a Outlet opening
33'b Outlet opening
33'c Outlet opening
33'd Outlet opening
34 Central protective strip section
34' Inlet opening
36 Adhesion surface
37 Double-sided adhesive strip
40 Pressing tool
41 Suction pads
42 Vacuum line/vacuum hose
44 Pressing dome
46 Circumferential pressing surface
47 Height-adjustment mechanism
50 Transverse rods
51 Vertical rods
52 Handle
53 Gap
60a Depression of the pressing dome
60b Depression of the pressing dome
60c Depression of the pressing dome
60d Depression of the pressing dome
61 Central depression of the pressing dome
70 Injection hose
71 Injection nozzle
72 Pump
80 Adhesive
S Airflow direction

What is claimed is:

1. A method for securing an attachment (3, 33) to a component, of a rotor blade (1), in which the component is provided with an adhesion surface (36);
   the attachment (3, 33) is provided with a corresponding adhesion surface (9);
   the adhesion surface (36) is placed on the corresponding adhesion surface (9);
   a gap (53) is formed between the adhesion surface (36) and the corresponding adhesion surface (9); and
   the attachment (3, 33) is pressed against the corresponding adhesion surface (9) and at the same time the adhesive (80) is injected into the gap (53) through an adhesive-conveying connection.

2. The method as claimed in claim 1, wherein the attachment (3, 33) is provided with the adhesive-conveying connection to the corresponding adhesion surface (9).

3. The method as claimed in claim 1, wherein the gap (53) is closed off circumferentially in an adhesive-tight manner.

4. The method as claimed in claim 3, wherein a double-sided adhesive strip (37) is stuck circumferentially onto the adhesion surface (36) and the attachment (3, 33) provided with the double-sided adhesive strip (37) is placed onto the corresponding adhesion surface (9) and, by means of an adhesively-bonded connection between the adhesion surface (36) and the corresponding adhesion surface (9), there forms an adhesive-tight seal which closes off the gap (53) circumferentially.

5. The method as claimed in claim 1, wherein at least one inlet opening and at least one outlet opening (34', 33'a, 33'b, 33'c, 33'd) are introduced into the attachment (3, 33), which openings form with the adhesion surface (36) the adhesive-conveying connection.

6. The method as claimed in claim 5, wherein regions of the at least one outlet opening (33'a, 33'b, 33'c, 33'd) which lie opposite the adhesion surface (36) are covered with a protective strip (33a, 33b, 33c, 33d) and the at least one outlet opening (33'a, 33'b, 33'c, 33'd) is introduced into the attachment (3, 33) through the respective protective strip (33a, 33b, 33c, 33d).

7. The method as claimed in claim 5, wherein the protective strips (33a, 33b, 33c, 33d) prevent excess adhesive (80), which has been introduced into the gap (53) and issues forth from the at least one outlet opening (33'a, 33'b, 33'c, 33'd), from coming into contact with the outer wall of the attachment (3, 33), and are removed again from the outer wall after the introduction of the adhesive (80).

8. The method as claimed in one of claim 1, wherein a pressing tool (40) is arranged temporarily on the attachment (3, 33) and suctions onto an outer wall (6) of the component (1) and presses the attachment (3, 33) against the outer wall (6) of the component (1) and holds the attachment (3, 33) in shape.

9. The method as claimed in claim 8, wherein the pressing tool (40) is in contact with the attachment (3, 33) on the circumferential edge of the latter and presses the circumferential edge against the corresponding adhesion surface (9).

10. The method as claimed in claim 1, wherein adhesive (80) is pressed into the gap (53) through the at least one inlet opening (34').

11. The method as claimed in claim 1, wherein a vacuum is produced in the gap (53) via at least one of the outlet openings (33'a, 33'b, 33'c, 33'd) and adhesive (80) is injected into the gap (53) through the inlet openings (34').

12. The method as claimed in claim 1, wherein the adhesion surface (36) and the corresponding adhesion surface (9) are roughened and/or cleaned.

13. A mounting apparatus with a pressing tool (40) for an attachment (3, 33) having an adhesion surface (36) against a corresponding adhesion surface (9) of a component of a rotor blade (1),
   having at least one suction pad (41) by means of which the pressing tool (40) can be temporarily suctioned onto a wall of the component (1), and
   by means of which the attachment (3, 33) can be pressed in a sealed manner, forming a gap (53) between the adhesion surface (36) and the corresponding adhesion surface (9), against the corresponding adhesion surface (9), and
   an injection device for injecting adhesive (80) into the gap (53) between the adhesion surface (36) and the corresponding adhesion surface (9).

14. The mounting apparatus as claimed in claim 13, wherein the pressing tool (40) has at least one of the suction pads (41).

15. The mounting apparatus as claimed in claim 13, wherein a rod assembly (50, 51) extends from the at least one suction pad (41) and the pressing tool (40) for the attachment (3, 33) is provided on a suction pad-side of the rod assembly (50, 51).

16. The mounting apparatus as claimed in claim 13, wherein the pressing tool (40) has a pressing dome (44) with a circumferential pressing surface (46).

17. The mounting apparatus as claimed in claim 16, having at least one depression (60a, 60b, 60c, 60d) in the pressing dome (44), which is sunk to the height of the circumferential pressing surface (46) and which permits actuation on the pressed attachment (3, 33).

18. The mounting apparatus as claimed in claim 13, wherein the pressing tool (40) is made height-adjustable with respect to the suction pads (41).

19. The mounting apparatus as claimed in claim 16, wherein the injection device has an injection nozzle (71) for connecting to the at least one inlet opening (34') of the attachment (3, 33).

20. The mounting apparatus as claimed in claim 19, wherein the injection nozzle (71) can be connected to the inlet opening (34') via one of the depressions (60a, 60b, 60c, 60d) of the pressing dome (44).

21. The mounting apparatus as claimed in claim 13, wherein the injection device has a vacuum pump which can be connected to all of the outlet openings (33'a, 33'b, 33'c, 33'd) on the attachment (3, 33), and which generates a vacuum in the gap (53).

* * * * *